(12) United States Patent
Wu et al.

(10) Patent No.: US 6,617,814 B1
(45) Date of Patent: Sep. 9, 2003

(54) INTEGRATED DC LINK CHOKE AND METHOD FOR SUPPRESSING COMMON-MODE VOLTAGE IN A MOTOR DRIVE

(75) Inventors: Bin Wu, Toronto (CA); Steven C. Rizzo, Cambridge (CA); Navid R. Zagari, Cambridge (CA); Yuan Xiao, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/832,389

(22) Filed: Apr. 11, 2001

(51) Int. Cl.[7] .................. H02M 5/458; H01F 21/08
(52) U.S. Cl. .................. 318/448; 318/509; 363/37; 336/221; 336/165
(58) Field of Search .................. 363/34, 37, 39, 363/40; 336/155, 165, 170, 221; 318/448, 508, 509, 510

(56) References Cited

U.S. PATENT DOCUMENTS

| | | | |
|---|---|---|---|
| 1,553,983 A | | 9/1925 | Casper |
| 3,231,841 A | | 1/1966 | Ohtake |
| 3,546,571 A | | 12/1970 | Fletcher et al. |
| 3,803,479 A | * | 4/1974 | Rathor |

(List continued on next page.)

FOREIGN PATENT DOCUMENTS

| AT | 211905 | | 11/1960 |
|---|---|---|---|
| AU | 15245/88 | | 2/1990 |
| DE | 3526047 A1 | | 7/1985 |
| JP | 19750147636 | | |
| | 19751211 | | 6/1977 |
| JP | 19760089435 | | |
| | 19760726 | | 2/1978 |
| JP | 19810163459 | | |
| | 19811015 | | 4/1983 |
| JP | 19810180011 | | |
| | 19811110 | | 5/1983 |
| JP | 19810180020 | | |
| | 19811110 | | 5/1983 |
| JP | 19870096587 | | |
| | 19870420 | | 10/1988 |
| RU | 706887 | | 12/1979 |

OTHER PUBLICATIONS

Bin Wu and Frank DeWinter, "Voltage Stress on Induction Motors in Medium Voltage(2300–6900V) PWM GTO CSI Drives", IEEE Transactions on Power Electronics, vol. 12, No. 2, Mar. 1997 pp. 213–220.

E. Cengelci, P. Enjeti, C. Singh, F. Blaabjerg and J. K. Pederson, "New Medium Voltage PWM Inverter Topologies for Adjustable Speed AC Motor Drive System", 1998, 7 pages.

Jack Daming, Bin Wu, Navid R. Zargari and Steven C. Rizzo, "A Space Vector Modulated CSI–Based AC Drive for Multimotor Applications", IEEE Transactions on Power Electronics, vol. 16, Jul. 4, 2001, 10 pages.

*Primary Examiner*—Bentsu Ro
(74) *Attorney, Agent, or Firm*—Amin & Turocy; Alexander M. Gerasimow; William R. Walbrun

(57) ABSTRACT

A motor drive and a choke therefor are disclosed, wherein the choke comprises a magnetic core with an inner leg and two outer legs, and four coils, which may be connected in DC current paths in the motor drive. First and second differential coils are wound around first and second outer legs, respectively; and first and second common-mode coils are wound around the inner leg of the choke. The first and second differential coils smooth the DC current on a DC bus in the motor drive, and the first and second common-mode coils suppress common-mode voltages in the motor drive. Also disclosed is a method for suppressing common-mode voltages in a motor drive.

30 Claims, 4 Drawing Sheets

U.S. PATENT DOCUMENTS

| | | |
|---|---|---|
| 3,887,862 A | 6/1975 | Hubner |
| 3,708,744 A | 1/1976 | Stephens et al. |
| 4,088,942 A | 5/1978 | Miko |
| 4,422,056 A | 12/1983 | Roberts |
| 4,739,466 A | 4/1988 | Glennon et al. |
| 4,849,950 A | 7/1989 | Sugiura et al. |
| 4,888,675 A | 12/1989 | Kumar et al. |
| 5,077,543 A | 12/1991 | Carlile |
| 5,083,101 A | 1/1992 | Frederick |
| 5,111,373 A | 5/1992 | Higaki |
| 5,119,059 A | 6/1992 | Covi et al. |
| 5,136,455 A | 8/1992 | Billingsley |
| 5,155,676 A | 10/1992 | Spreen |
| 5,195,232 A | 3/1993 | Frederick |
| 5,355,055 A | 10/1994 | Tary |
| 5,483,136 A | 1/1996 | Marcinkiewicz |
| 5,525,951 A | 6/1996 | Sunano et al. |
| 5,528,205 A | 6/1996 | Wong |
| 5,552,976 A | 9/1996 | Munro et al. |
| 5,635,890 A | 6/1997 | Yamaguchi et al. |
| 5,731,666 A | 3/1998 | Folker et al. |
| 5,747,981 A | 5/1998 | Callanan |
| 5,752,838 A | 5/1998 | Nishizawa |
| 5,808,882 A | 9/1998 | Mochikawa |
| 5,835,364 A | 11/1998 | DeWinter et al. |
| 5,903,066 A | 5/1999 | Enjeti et al. |
| 5,905,642 A | 5/1999 | Hammond |
| 6,144,269 A | 11/2000 | Okamoto et al. |
| 6,151,228 A | 11/2000 | Miyazaki et al. |
| 6,154,378 A * | 11/2000 | Peterson et al. ............... 363/37 |
| 6,166,929 A | 12/2000 | Ma et al. |
| 6,178,102 B1 | 1/2001 | Stanley |
| 6,356,182 B1 * | 3/2002 | Nagashima .................. 336/200 |
| 6,377,479 B1 * | 4/2002 | Ayano et al. .................. 363/40 |

* cited by examiner

INTEGRATED DC LINK CHOKE AND METHOD FOR SUPPRESSING COMMON-MODE VOLTAGE IN A MOTOR DRIVE

TECHNICAL FIELD

The invention relates generally to the art of electric motors and motor drives and more particularly to an integrated DC link choke and methodology for suppressing common-mode voltage and smoothing DC current in a motor drive.

BACKGROUND OF THE INVENTION

In the field of electric motors and motor drives, a motor is connected to a motor drive, which provides electrical power to the motor in a controlled fashion, wherein the motor drive may take a variety of forms, such as a current source inverter (CSI), voltage source inverter (VSI) or the like. Such motor drives are commonly employed to provide electrical power to motors. The motor drive may be employed in order to provide speed control, torque control, and/or to control other motor performance characteristics. For AC motors, electrical power is converted in the motor drive from supply power, typically AC power from a utility or other source, into DC. The DC power is then converted, for example using an inverter stage, into AC power at a controlled frequency and amplitude, which is provided to the motor windings.

The AC to DC converter stage in the motor drive, and/or the subsequent inverter stage, often comprise solid state semiconductor-based switching elements, such as silicon-controlled rectifiers (SCRs), gate turn-off thyristors (GTOs), gate commutated thyristors (GCTs), insulated gate bipolar transistors (IGBTs), or other switching devices. As the switching elements are activated in the AC to DC converter stage or the inverter stage, common-mode voltages are produced. This common-mode voltage appears in the output phases of the motor drive, and hence, on the motor windings. Where a neutral associated with the input power source is grounded, this common-mode voltage appears between the motor windings and ground, and may reach levels beyond the motor winding insulation ratings. Consequently, such common-mode voltages may damage the motor or decrease the life expectancy thereof.

Conventional approaches to addressing this motor drive common-mode voltage problem have included designing the motor winding insulation to higher voltage ratings. However, this approach provides no solution for existing motors, which do not include insulation capable of withstanding the common-mode voltage levels. Another approach has been to provide an isolation transformer between the power source and the motor drive AC power input terminals. However, such an isolation transformer must be rated to handle the common-mode voltage levels. In addition, isolation transformers add cost and occupy space in the motor drive system. Thus, there is a need for apparatus and techniques to reduce or minimize the common-mode voltages in a motor drive, which do not require isolation transformers, and which operate in association with existing motors.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The invention provides a motor drive and a choke therefor, wherein the choke comprises a magnetic core with an inner leg and two outer legs, and four coils, which may be connected in DC current paths in the motor drive. First and second differential coils are wound around first and second outer legs, respectively; and first and second common-mode coils are wound around the inner leg of the choke. The first and second differential coils smooth the DC power on a DC bus in the motor drive, and the first and second common-mode coils suppress common-mode voltages in the motor drive. The invention thus provides an integrated DC link choke, which may be employed to provide both DC current smoothing and common-mode voltage suppression in a motor drive. In addition, the invention provides for a solution to the above motor drive common-mode voltage problems, whereby motors need not include extra insulation beyond the normal motor ratings, and whereby no external isolation transformers are required for a motor drive system.

According to one aspect of the invention, a choke provides a differential inductance and suppresses common-mode voltages in a motor drive having an AC to DC converter stage for converting AC power to DC power on a DC bus with positive and negative DC current paths, and an inverter stage for converting DC power from the DC bus to AC motor power in a controlled fashion. The choke comprises a magnetic core having an inner leg extending between an upper member and a lower member, and first and second outer legs extending from the lower member toward the upper member. A first air gap is provided between the first outer leg and the upper member and a second air gap is provided between the second outer leg and the upper member.

First and second differential coils are wound around the first and second outer legs, respectively, and may be connected in the positive and negative DC current paths of the motor drive, respectively, to smooth the DC power on the DC bus. The differential coils may be wound on the core to provide a differential flux in a differential flux path through the first and second outer legs, the first and second air gaps, and the upper and lower members of the core in response to differential current in the positive and negative DC current paths of the motor drive, whereby a differential inductance is provided to smooth DC power on the motor drive DC bus.

In addition, first and second common-mode coils are wound around the inner leg of the choke, which may also be connected in the positive and negative DC current paths, respectively, to suppress common-mode voltages in the motor drive. The common-mode coils provide a first common-mode flux in a common-mode flux path through the inner leg, the first and second outer legs, the first and second air gaps, and the upper and lower members of the core in response to common-mode current in the positive and negative DC current paths. The common-mode coils thus provide a common-mode inductance to suppress common-mode voltages in the motor drive. In addition, the differential coils may be wound around the outer legs of the core in order to provide a second common-mode flux in the common-mode flux path in response to common-mode current in the positive and negative DC current paths. The common-mode coils and the differential coils may thus provide a common-mode inductance to suppress common-mode voltages in the motor drive. The common-mode inductance and the differential inductance may be adjusted independently of one another according to a particular motor drive design.

Another aspect of the invention provides a motor drive for providing AC power to a motor in a controlled fashion. The motor drive comprises an AC to DC converter stage for converting AC power to DC power on a DC bus with positive and negative DC current paths, and an inverter stage for converting DC power from the DC bus to AC motor power in a controlled fashion. The motor drive further comprises a choke for providing a differential inductance and suppressing common-mode voltages in the motor drive. The choke comprises a magnetic core having an inner leg extending between an upper member and a lower member, and first and second outer legs extending from the lower member toward the upper member and providing a first air gap between the first outer leg and the upper member and a second air gap between the second outer leg and the upper member. First and second differential coils are wound around the first and second outer legs, respectively, and first and second common-mode coils are wound around the inner leg. The first and second differential coils are connected in the positive and negative DC current paths, respectively, to smooth the DC power on the DC bus, and the first and second common-mode coils are connected in the positive and negative DC current paths, respectively, to suppress common-mode voltages in the motor drive.

Yet another aspect of the invention provides a methodology by which common-mode voltages may be suppressed in a motor drive. A magnetic core is provided having an inner leg and two outer legs. First and second differential coils are wound around the first and second outer legs, respectively, and first and second common-mode coils are wound around the inner leg. The first differential and common-mode coils are connected in a positive DC current path in the motor drive, and the second differential and common-mode coils are connected in a negative DC path, so as to suppress common-mode voltages in the motor drive.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
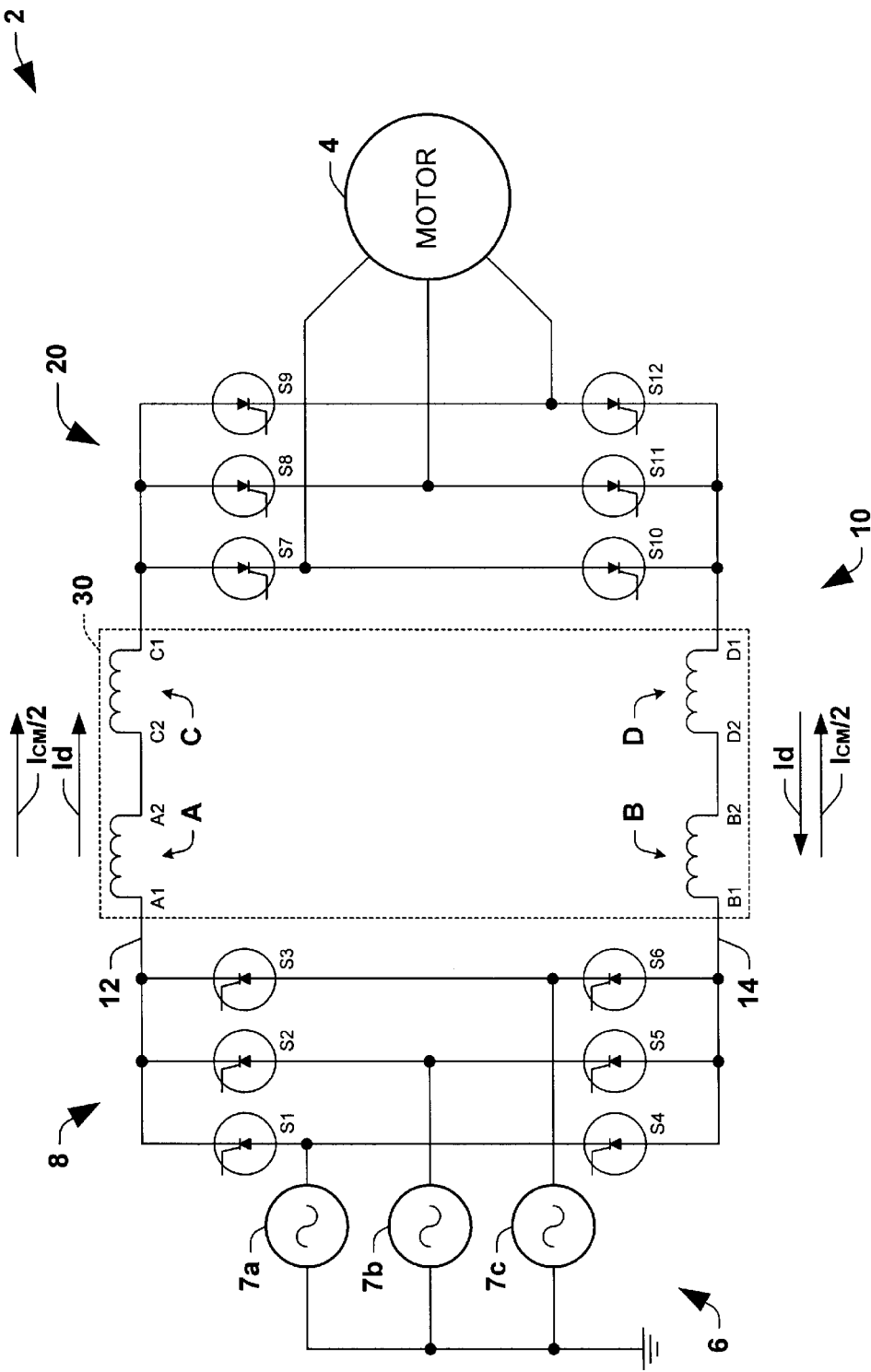
FIG. 1 is a schematic illustration of an exemplary motor drive for providing AC power to a motor in a controlled fashion in accordance with an aspect of the present invention.

The various aspects of the present invention will now be described with reference to the drawings, wherein like reference numerals are used to refer to like elements throughout. The invention provides a choke for use in a motor drive, which comprises a magnetic core with an inner leg and two outer legs, and four coils, which may be connected in DC current paths in the motor drive. First and second differential coils are wound around first and second outer legs, respectively; and first and second common-mode coils are wound around the inner leg of the choke. The first and second differential coils smooth the DC power on a DC bus in the motor drive, and the first and second common-mode coils suppress common-mode voltages in the motor drive. In addition, the differential coils may also suppress common-mode voltages. The invention thus provides an integrated DC link choke, which may be employed to provide both DC current smoothing and common-mode voltage suppression in a motor drive.

Referring now to FIG. 1, an exemplary motor drive 2 is illustrated for providing AC electric power to an electric motor 4 in a controlled fashion, wherein the motor 4 may be an induction or other type of AC motor. Electric power is provided to the drive 2 from a three phase input power source 6 comprising AC power sources 7a, 7b, and 7c, interconnected in a "Y" arrangement, with a grounded neutral. Three phase AC power from the input power source 6 is provided to an AC to DC converter stage 8 comprising switching elements S1, S2, S3, S4, S5, and S6, which may be selectively actuated by control signals (not shown) thereto in order to generate DC power on a DC bus 10 having a positive DC current path 12 and a negative DC current path 14 in a manner known in the art. DC power from the bus 10 is then converted to AC motor power via an inverter stage 20 comprising switching elements S7, S8, S9, S10, S11, and S12. The switching elements S7–S12 may be activated according to control signals (not shown) in a manner known in the art in order to provide AC power of appropriate amplitude and phase to the motor 4 in a controlled fashion.

The motor drive 2 further comprises a choke 30 for providing a differential inductance to smooth DC power on the bus 10, and also to suppress common-mode voltages in the motor drive 2 in accordance with an aspect of the invention. The choke 30 comprises first and second differential coils A and B connected in the positive and negative DC current paths 12 and 14, respectively, to smooth the DC power on the DC bus 10. In addition, choke 30 comprises first and second common-mode coils C and D connected in the positive and negative DC current paths 12 and 14, respectively, to suppress common-mode voltages resulting from switching of one or more switching elements S1–S12 in the motor drive 2. Coils A and C are connected in series in the positive DC current path 12 with terminal A1 of coil A connected to switches S1–S3 of the AC to DC converter stage 8, terminal A2 of coil A connected to Terminal C2 of coil C, and terminal C1 of coil C connected to switches S7–S9 of the inverter stage 20, whereby DC current Id flows through the coils A and C in the positive DC current path 12 of the DC bus 10.

Coils B and D are connected in series in the negative DC current path 14 with terminal B1 of coil B connected to switches S4–S6 of the AC to DC converter stage 8, terminal B2 of coil B connected to Terminal D2 of coil D, and terminal D1 of coil D connected to switches 510–S12 of the inverter stage 20. Thus connected, DC current Id flows through the coils B and D in the negative DC current path 14 of the DC bus 10. By the inclusion of the choke 30, the motor drive 2 provides for smoothing of ripple current on the DC bus 10 via a differential inductance provided to the DC current Id by the differential coils A and B, as well as suppression of common-mode voltages via a common-mode inductance provided by the differential coils C and D. In this regard, it will be noted that common-mode current $I_{CM}$ flows through the positive and negative current paths 12 and 14 in the directions indicated in FIG. 1. In addition, the first and second differential coils A and B may provide further suppression of common-mode voltages in the motor drive 2.

Other forms and topologies of motor drives are possible within the scope of the present invention, including the exemplary motor drive 2 of FIG. 1 as well as other motor drives not illustrated and described herein. For example, the motor drive 2 may be modified by inclusion of line inductors between the single phase power sources 7a, 7b, and 7c, and the switching elements S1, S2, S3, S4, S5, and S6 of the AC to DC converter stage 8, output capacitors connected between the motor phase windings and a common neutral, and/or a capacitance connected across the DC bus 10.

Figure 2:
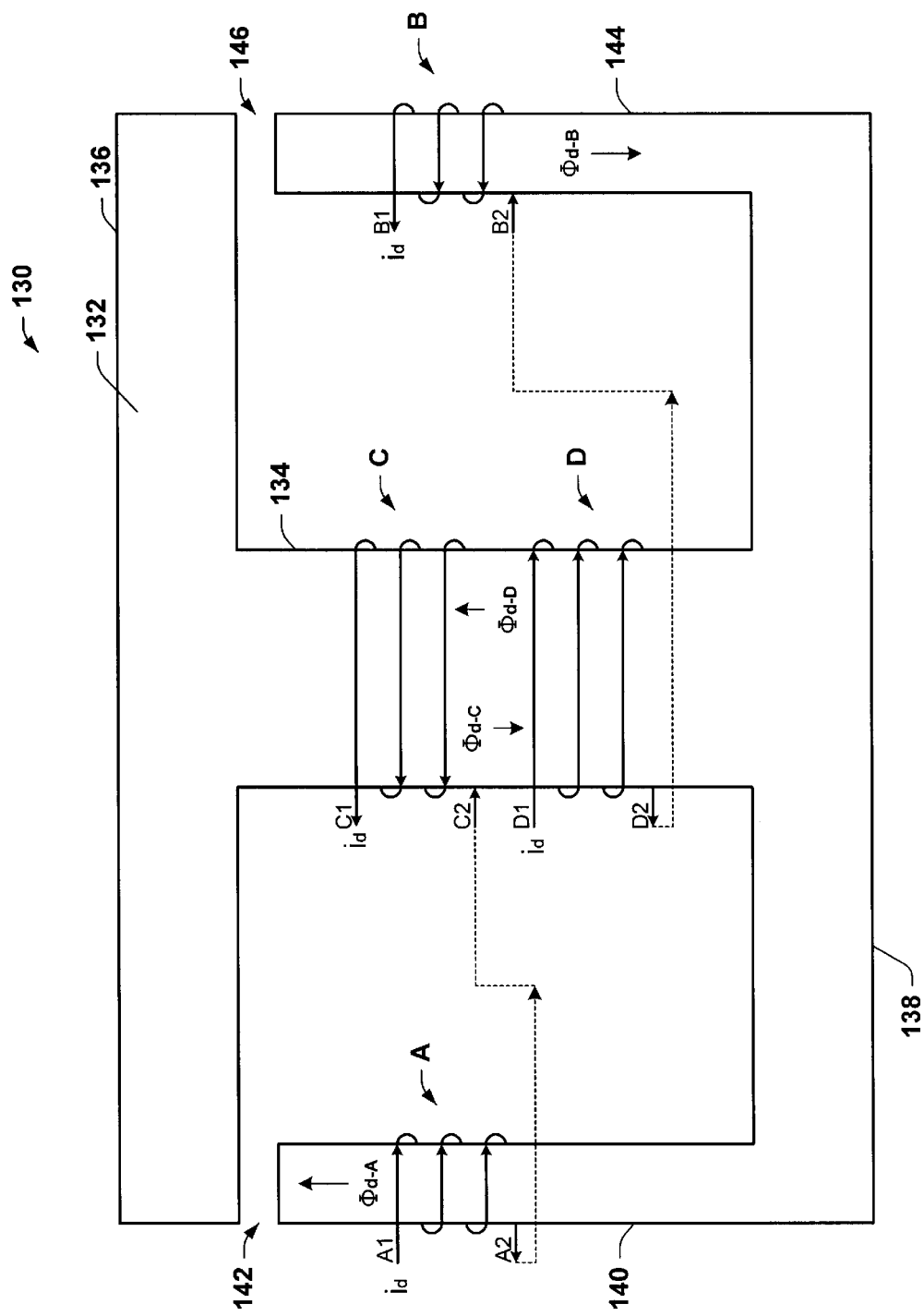
FIG. 2 is a side elevation view of an exemplary choke for providing a differential inductance and suppressing common-mode voltages in a motor drive according to another aspect of the invention.
Figure 3:
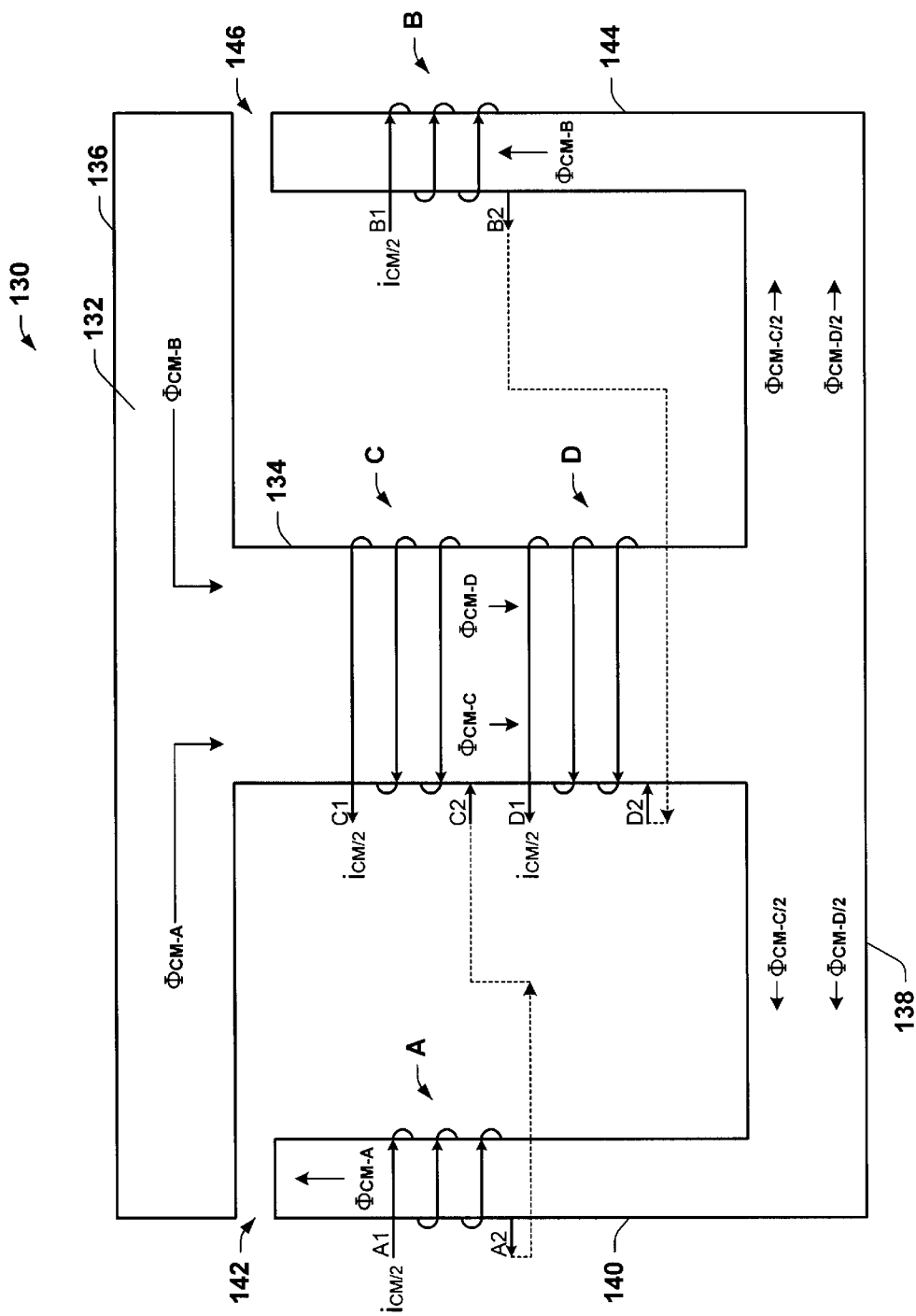
FIG. 3 is a side elevation view further illustrating the choke of FIG. 2.

Referring now to FIGS. 2 and 3, an exemplary choke 130 is illustrated, which may be employed to provide a differential inductance and suppress common-mode voltages in a motor drive in accordance with another aspect of the invention. For example, the choke 30 may be employed in a motor drive, such as drive 2 of FIG. 1, having an AC to DC converter stage for converting AC power to DC power on a DC bus with positive and negative DC current paths, and an inverter stage for converting DC power from the DC bus to AC motor power in a controlled fashion, although the choke 130 finds application in association with motor drives and power converters apart from those illustrated and described herein.

The choke 130 comprises a magnetic core 132 having an inner leg 134 extending between an upper member 136 and a lower member 138. While the exemplary choke core 132 is illustrated as having a generally rectangular profile, core profiles and orientations other than those illustrated and described herein are contemplated as falling within the scope of the invention, for example, rounded profiles, and the like. The core 132 may be made of any suitable material for creating a choke, as is known in the art. A first outer leg 140 extends from the lower member 138 toward the upper member 136 with a first air gap 142 therebetween, and a second outer leg 144 extends from the lower member 138 toward the upper member 136 with a second air gap 146 between the second outer leg 144 and the upper member 136.

The choke 130 further comprises a first differential coil A wound around the first outer leg 140, and a second differential coil B wound around the second outer leg 144. The differential coils A and B, as well as the exemplary common-mode coils C and D described hereinafter, may be made of any suitable material as is known for conducting current, and may include appropriate insulation. Furthermore, the number of turns of the various coils may be determined according to a particular application, such as a specific motor drive or power conversion system. The differential coils A and B may be used for smoothing DC current in a motor drive as illustrated and described in greater detail hereinafter. For instance, the first and second differential coils A and B may be connected in positive and negative DC current paths, respectively, in a motor drive (e.g., motor drive 2 of FIG. 1) in order to smooth DC current in the drive. In addition, the choke 130 comprises first and second common-mode coils C and D, respectively, wound around the inner leg 134. The common-mode coils C and D may provide suppression or reduction in common-mode voltages in a motor drive in accordance with the invention. For example, the first and second common-mode coils C and D may be connected in the positive and negative DC current paths, respectively, to suppress common-mode voltages in the motor drive.

The coils A, B, C, and D of the choke 130 may be connected in a motor drive in a fashion similar to that of choke 30 in the motor drive 2 of FIG. 1 in order to reduce common-mode voltages and smooth DC current therein. Thus, a differential DC current Id may flow into a terminal A1 of coil A, from terminal A2 of coil A into a terminal C2 of coil C, and out of terminal C1 of coil C. For instance, the terminals A2 and C2 may be connected together, with terminals A1 and C1 connected in a positive DC current path of a DC power bus in a motor drive (e.g., path 12 of drive 2). Similarly, a DC current Id may flow in a return or negative current path (e.g., path 14 of drive 2) into a terminal D1 of coil D, from a terminal D2 of coil D into a terminal B2 of coil B, and out of a terminal B1 of coil B. Thus, the terminals D2 and B2 may be connected together, with terminals D1 and B1 connected in a negative or return DC current path of a DC power bus in a motor drive.

Thus connected, the choke 130 advantageously provides a differential inductance to smooth DC current in a motor drive DC bus, as well as a common-mode inductance to suppress common-mode voltages in the motor drive. Where the number of turns of coils A, B, C, and D are the same, the common-mode inductance is about 2.25 times the differential inductance. In addition, the common-mode and differential inductances may be independently adjusted for a particular motor drive or other power conversion application, for example, through adjusting the relative number of turns in the coils A, B, C, and D. As illustrated in FIG. 2, the first and second differential coils A and B provide differential fluxes $\Phi_{d-A}$ and $\Phi_{d-B}$ in a differential flux path through the first and second outer legs 140 and 144, the first and second air gaps 142 and 146, and the upper and lower members 136 and 138 of the core 132 in response to a differential current Id in the positive and negative DC current paths. It will be noted that the first and second common-mode coils C and D are wound around the inner leg 134 so as to provide substantially zero differential flux in the core 132 in response to differential current Id, wherein the differential fluxes $\Phi_{d-C}$ and $\Phi_{d-D}$ related thereto in the inner leg 134 cancel each other.

Referring also to FIG. 3, the first and second common-mode coils C and D further provide a first common-mode flux comprising ($\Phi_{CM-C}$ and $\Phi_{CM-D}$ in a common-mode flux path through the inner leg 134, the first and second outer legs 140 and 144, the first and second air gaps 142 and 146, and the upper and lower members 136 and 138, respectively, of the core 132 in response to common-mode current $I_{CM}$ in the positive and negative DC current paths of the motor drive. In this case, it is noted that whereas the differential current Id flows into terminal D1 and out of terminal B1 (e.g., FIGS. 1 and 2), the common-mode current $I_{CM}/2$ flows into terminal B1 and out of terminal D1 (e.g., FIGS. 1 and 3). In addition, the first and second differential coils A and B provide a second common-mode flux comprising $\Phi_{CM-A}$ and $\Phi_{CM-B}$ in the common-mode flux path in response to common-mode current in the positive and negative DC current paths.

As illustrated in FIGS. 2 and 3, therefore, the common-mode coils C and D and the differential coils A and B provide a common-mode inductance to suppress common-mode voltages in the motor drive, whereas the differential coils A and B provide a differential inductance to smooth the DC current on the DC bus. Due to the winding of the common-mode coils C and D around the inner leg 134, substantially no differential inductance is provided by the coils C and D.

The exemplary integrated choke 130 of FIGS. 2 and 3 has been found to provide significant advantages in suppressing common-mode voltages in motor drives. In this regard, the ratio between the common-mode inductance provided by coils A, B, C, and D to the differential inductance provided by coils A and B facilitates the use of the choke 130 in suppressing common-mode voltages while smoothing DC power in the motor drive DC bus. The integration of the four windings A, B, C, and D, moreover, provides for induction ratios (e.g., common-mode to differential) higher than those attainable using separate differential and common-mode chokes with an equivalent number of turns.

For example, referring to FIG. 2 and assuming each of the coils A, B, C, and D comprises an integer number N turns, the differential inductance Ld in the exemplary choke 130 is given by the following equation (1):

$$Ld=(N_A+N_B)^2/R=2N^2/R; \qquad (1)$$

where R is the reluctance of the core 132, and where $N_A=N_B=N$.

Referring to FIG. 3, and again assuming each coil A, B, C, and D has an integer number N turns, the common-mode inductance $L_{CM-AC}$ produced by the coils A and C in the exemplary choke 130 is given by the following equation (2):

$$L_{CM-AC}=L_A+L_C=3N^2/R+6N^2/R=9N^2/R; \qquad (2)$$

and the common-mode inductance $L_{CM-BD}$ produced by the coils B and D in the choke 130 is given by the following equation (3):

$$L_{CM-BD}=L_B+L_D=3N^2/R+6N^2/R=9N^2/R. \qquad (3)$$

The common-mode inductances $L_{CM-AC}$ and $L_{CM-BD}$ are effectively in parallel. Thus, the total common-mode inductance $L_{CM}$ produced by the coils A, B, C, and D of the choke 130 is given by the following equation (4):

$$L_{CM}=L_{CM-AC}//L_{CM-BD}=9N^2/R//9N^2/R=9N^2/2R. \qquad (4)$$

Accordingly, the ratio of the common-mode inductance $L_{CM}$ for the choke 130 to the differential inductance Ld is given by the following equation (5):

$$L_{CM}/Ld=(9N^2/2R)/(2N^2/R)=9/4=2.25. \qquad (5)$$

It will be appreciated that other common-mode to differential inductance ratios are obtainable within the scope of the invention, for example, via adjustment of the relative number of turns in the respective coils A, B, C, and D.

Figure 4:
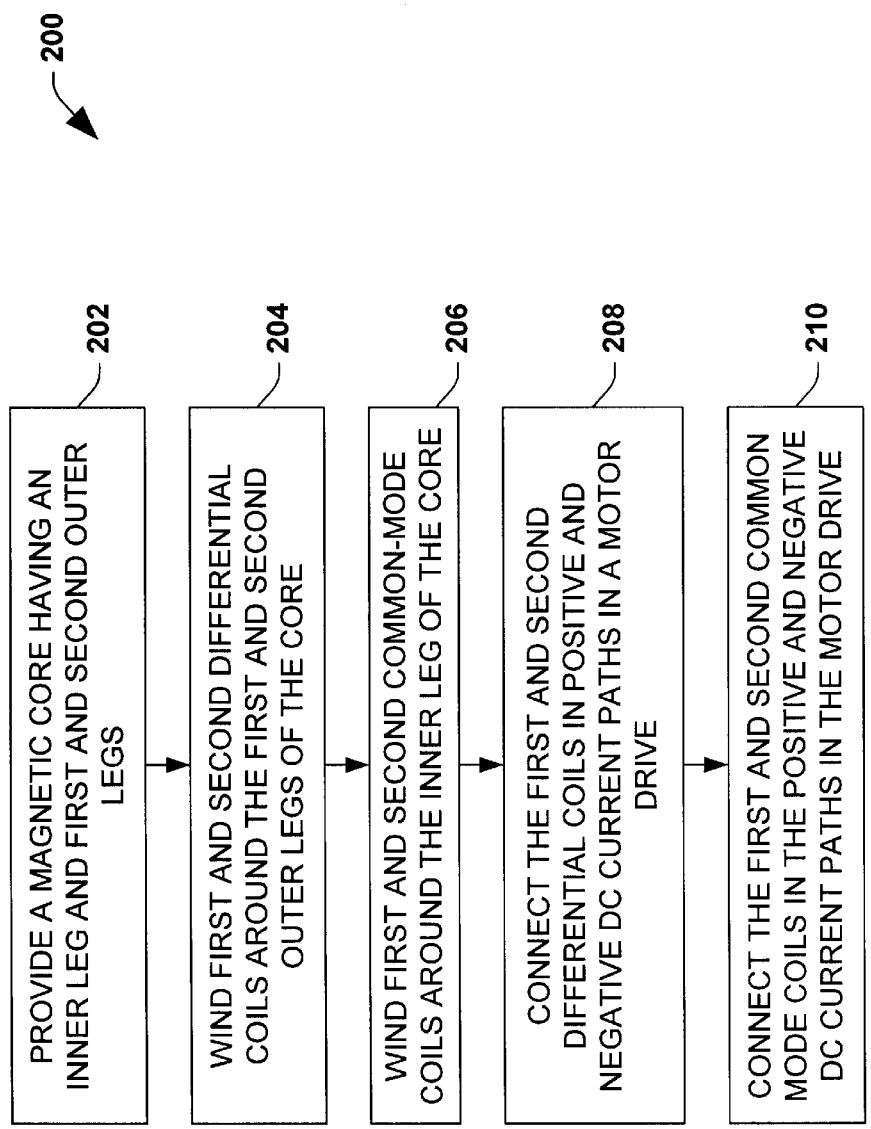
FIG. 4 is a flow diagram illustrating an exemplary method of suppressing common-mode voltages in a motor drive according to another aspect of the invention.

Another aspect of the invention provides methodologies by which common-mode voltages may be reduced or suppressed in a motor drive. One such method 200 is illustrated in FIG. 4. While the exemplary method 200 is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 200 and other methods according to the invention, may be implemented in association with the apparatus and systems illustrated and described herein, as well as in association with other systems and apparatus not illustrated or described.

Beginning at 202, a magnetic core is provided, which comprises an inner leg and first and second outer legs. The inner leg may extend between upper and lower members, and the first and second outer legs may extend from the lower member toward the upper member, with first and second air gaps in between. At 204, first and second differential coils are wound around the first and second outer legs, respectively, of the core, after which first and second common-mode coils are wound around the inner leg at 206. At 208, the first and second differential coils are connected in positive and negative DC current paths in a motor drive, respectively, and at 210 the first and second common-mode coils are respectively connected in the positive and negative DC current paths. The method 200 thus provides for reducing or suppressing common-mode voltages in a motor drive by the configuration and connection of the differential and common mode coils with respect to the core and the motor drive.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A choke for providing a differential inductance and suppressing common-mode voltages in a motor drive having an AC to DC converter stage for converting AC power to DC power on a DC bus with positive and negative DC current paths, and an inventor stage for converting DC power from the DC bus to AC motor power in a controlled fashion, the choke comprising:
   a magnetic core having an inner leg extending between an upper member and a lower member, and first and second outer legs extending from the lower member toward the upper member and providing a first air gap between the first outer leg and the upper member and a second air gap between the second outer leg and the upper member;

first and second differential coils wound around the first and second outer legs, respectively; and first and second common-mode coils wound around the inner leg;

wherein the first and second differential coils are adapted for connection in the positive and negative DC current paths, respectively, to smooth the DC power on the DC bus, and wherein the first and second common-mode coils are adapted for connection in the positive and negative DC current paths, respectively, to suppress common-mode voltages in the motor drive.

2. The choke of claim 1, wherein the first and second common-mode coils are wound around the inner leg to provide substantially zero differential flux in the core in response to differential current in the positive and negative DC current paths.

3. The choke of claim 2, wherein the first and second differential coils provide a differential flux in a differential flux path through the first and second outer legs, the first and second air gaps, and the upper and lower members of the core in response to differential current in the positive and negative DC current paths.

4. The choke of claim 3, wherein the first and second common-mode coils provide a first common-mode flux in a common-mode flux path through the inner leg, the first and second outer legs, the first and second air gaps, and the upper and lower members of the core in response to common-mode current in the positive and negative DC current paths.

5. The choke of claim 4, wherein the first and second differential coils provide a second common-mode flux in the common-mode flux path in response to common-mode current in the positive and negative DC current paths.

6. The choke of claim 5, wherein the first and second common-mode coils and the first and second differential coils provide a common-mode inductance to suppress common-mode voltages in the motor drive.

7. The choke of claim 6, wherein the first and second differential coils provide a differential inductance to smooth the DC current on the DC bus.

8. The choke of claim 7, wherein common-mode inductance is about 2.25 times the differential inductance.

9. The choke of claim 7, wherein the common-mode inductance and the differential inductance are independently adjustable.

10. The choke of claim 1, wherein the first and second differential coils provide a differential flux in a differential flux path through the first and second outer legs, the first and second air gaps, and the upper and lower members of the core in response to differential current in the positive and negative DC current paths.

11. The choke of claim 10, wherein the first and second common-mode coils provide a first common-mode flux in a common-mode flux path through the inner leg, the first and second outer legs, the first and second air gaps, and the upper and lower members of the core in response to common-mode current in the positive and negative DC current paths.

12. The choke of claim 1, wherein the first and second common-mode coils provide a first common-mode flux in a common-mode flux path through the inner leg, the first and second outer legs, the first and second air gaps, and the upper and lower members of the core in response to common-mode current in the positive and negative DC current paths.

13. The choke of claim 12, wherein the first and second differential coils provide a second common-mode flux in the common-mode flux path in response to common-mode current in the positive and negative DC current paths.

14. The choke of claim 1, wherein the first and second common-mode coils and the first and second differential coils provide a common-mode inductance to suppress common-mode voltages in the motor drive.

15. The choke of claim 14, wherein the first and second differential coils provide a differential inductance to smooth the DC power on the DC bus.

16. The choke or claim 15, wherein common-mode inductance is about 2.25 times the differential inductance.

17. The choke of claim 15, wherein the commnon-mode inductance and the differential inductance are independently adjustable.

18. The choke of claim 1, further comprising a motor drive having at least one of:

an A/D converter;

a first and a second winding for smoothing DC power;

a third and fourth winding for suppressing common-mode voltages, and a D/A converter.

19. A motor drive for providing AC power to a motor in a controlled fashion, comprising:

an AC to DC converter stage for converting AC power to DC power on a DC bus with positive and negative DC current paths;

an inverter stage for converting DC power from the DC bus to AC motor power in a controlled fashion; and a choke for providing a differential inductance and suppressing common-mode voltages in the motor drive, the choke comprising:

a magnetic core having an inner leg extending between an upper member and a lower member, and first and second outer legs extending from the lower member toward the upper member and providing a first air gap between the first outer leg and the upper member and a second air gap between the second outer leg and the upper member, first and second differential coils wound around the first and second outer legs, respectively; and first and second commnon-mode coils wound around the inner leg;

wherein the first and second differential coils are connected in the positive and negative DC current paths, respectively, to smooth the DC current on the DC bus, and wherein the first and second common-mode coils are connected in the positive and negative DC current paths, respectively, to suppress common-mode voltages in the motor drive.

20. The motor drive of claim 19, wherein the first and second common-mode coils are wound around the inner leg to provide substantially zero differential flux in the core in response to differential current in the positive and negative DC current paths.

21. The motor drive of claim 19, wherein the first and second differential coils provide a differential flux in a differential flux path through the first and second outer legs, the first and second air gaps, and the upper and lower members of the core in response to differential current in the positive and negative DC current paths.

22. The motor drive of claim 21, wherein the first and second common-mode coils provide a first common-mode flux in a common-mode flux path through the inner leg, the first and second outer legs, the first and second air gaps, and the upper and lower members of the core in response to common-mode current in the positive and negative DC current paths.

23. The motor drive of claim 19, wherein the first and second common-mode coils provide a first common-mode flux in a common-mode flux path through the inner leg, the first and second outer legs, the first and second air gaps, and the upper and lower members of the core in response to common-mode current in the positive and negative DC current paths.

24. The motor drive of claim 23, wherein the first and second differential coils provide a second common-mode flux in the common-mode flux path in response to common-mode current in the positive and negative DC current paths.

25. The motor drive of claim 19, wherein the first and second common-mode coils and the first and second differential coils provide a common-mode inductance to suppress common-mode voltages in the motor drive.

26. The motor drive of claim 25, wherein the first and second differential coils provide a differential inductance to smooth the DC power on the DC bus.

27. The motor drive of claim 26, wherein common-mode inductance is about 2.25 times the differential inductance.

28. The motor drive of claim 26, wherein the common-mode inductance and the differential inductance are independently adjustable.

29. A motor drive for providing AC power to a motor in a controlled fashion, comprising:
    an AC to DC converter stage for converting AC power to DC power on a DC bus with positive and negative DC current paths;
    an inverter stage for converting DC power from the DC bus to AC motor power in a controlled fashion; and
    a choke having first and second differential coils connected in the positive and negative DC current paths, respectively, to smooth the DC current on the DC bus, and first and second common-mode coils connected in the positive and negative DC current paths, respectively, to suppress common-mode voltage in the motor drive.

30. A method for suppressing common-mode voltages in a motor drive, comprising:
    providing a magnetic core having an inner leg extending between an upper member and a lower member, and first and second outer legs extending from the lower member toward the upper member, and with a first air gap between the first outer leg and the upper member and a second air gap between the second outer leg and the upper member;
    winding first and second differential coils around the first and second outer legs of the magnetic core, respectively;
    winding first and second common-mode coils around the inner leg of the magnetic core;
    connecting the first and second differential coils in positive and negative DC current paths in the motor drive, respectively, so as to smooth DC current in the motor drive; and
    connecting the first and second common-mode coils in the positive and negative DC current paths, respectively, so as to suppress common-mode voltages in the motor drive.

* * * * *